(12) United States Patent
Kropp et al.

(10) Patent No.: US 9,189,812 B2
(45) Date of Patent: Nov. 17, 2015

(54) KIOSK AND METHOD FOR RENTING CARPET CLEANING MACHINES

(71) Applicant: Rug Doctor, LLC, Plano, TX (US)

(72) Inventors: David A. Kropp, Plano, TX (US); Timothy J. Wall, Plano, TX (US)

(73) Assignee: Rug Doctor, LLC, Plano, TX (US)

( * ) Notice: Subject to any disclaimer, the term of this patent is extended or adjusted under 35 U.S.C. 154(b) by 0 days.

(21) Appl. No.: 14/049,931

(22) Filed: Oct. 9, 2013

(65) Prior Publication Data

US 2014/0100972 A1    Apr. 10, 2014

Related U.S. Application Data

(60) Provisional application No. 61/711,625, filed on Oct. 9, 2012.

(51) Int. Cl.
*G06Q 30/06* (2012.01)
*G07C 9/00* (2006.01)
*G07F 17/00* (2006.01)

(52) U.S. Cl.
CPC ........ *G06Q 30/0645* (2013.01); *G06Q 30/0641* (2013.01); *G07C 9/00007* (2013.01); *G07F 17/0042* (2013.01)

(58) Field of Classification Search
None
See application file for complete search history.

(56) References Cited

U.S. PATENT DOCUMENTS

| | | | |
|---|---|---|---|
| 3,800,284 A | 3/1974 | Zucker et al. | |
| 3,860,911 A | 1/1975 | Hinman et al. | |
| 4,396,914 A | 8/1983 | Aston | |
| 4,870,400 A | 9/1989 | Downs et al. | |
| 5,089,692 A | 2/1992 | Tonnesson | |
| 5,170,431 A | 12/1992 | Dawson et al. | |
| 5,488,660 A | 1/1996 | Dawson et al. | |
| 5,709,114 A | 1/1998 | Dawson et al. | |

(Continued)

FOREIGN PATENT DOCUMENTS

| | | |
|---|---|---|
| GB | 1467891 A | 3/1977 |
| JP | 2009002034 A | 1/2009 |

(Continued)

OTHER PUBLICATIONS

Woodford, "Two-Factor Authentication", Aug. 20, 2014, http://www.explainthatstuff.com/how-security-tokens-work.html.

(Continued)

*Primary Examiner* — Shay S Glass
*Assistant Examiner* — Russell S. Glass
(74) *Attorney, Agent, or Firm* — Clyde L. Smith

(57) ABSTRACT

A kiosk for leasing carpet cleaning machines to customers comprises a storage unit and an electronic input device. The storage unit is configured to house a carpet cleaning device and comprises a locking portion and an electronically controlled lock. The electronically controlled lock is able to, alternatively, lock and unlock the locking portion. The storage unit is configured such that the carpet cleaning machine can be secured thereto by electronically locking the locking portion, and such that the carpet cleaning machine can be removed from or returned to the storage unit when the locking portion is unlocked. The electronic input device is adapted and configured to obtain a code key from a customer and to cause the electronically controlled lock to unlock the locking portion following the receipt of the code key without any remote communication with any other non-customer device external to the kiosk.

13 Claims, 10 Drawing Sheets

(56) References Cited

U.S. PATENT DOCUMENTS

| | | |
|---|---|---|
| 6,402,030 B1 | 6/2002 | Summers et al. |
| 6,415,386 B1 | 7/2002 | Shi et al. |
| 2001/0033752 A1 | 10/2001 | Cook et al. |
| 2002/0070226 A1 | 6/2002 | Liff et al. |
| 2006/0080063 A1* | 4/2006 | Vaughn .................... 702/187 |
| 2007/0271112 A1 | 11/2007 | Davis |
| 2011/0210818 A1 | 9/2011 | Denison et al. |
| 2012/0130535 A1 | 5/2012 | Kropp et al. |
| 2013/0254123 A1* | 9/2013 | Mullin et al. .............. 705/307 |
| 2014/0145820 A1 | 5/2014 | Schwarze et al. |

FOREIGN PATENT DOCUMENTS

| | | |
|---|---|---|
| KR | 100794126 B1 | 1/2008 |
| WO | 2011113332 A1 | 9/2011 |

OTHER PUBLICATIONS

Kaba, "Questor—Electronic Combination Safe Lock", May 26, 2014, http://www.kaba.co.uk/solutions/safe-locks/electronic-combination-safe-locks/67878/questor.html.

Espace Patent Abstract Translation for KR Publication No. 100794126.

Espace Patent Abstract Translation for JP Publication No. 2009002034.

* cited by examiner

FIG. 4
FIG. 5
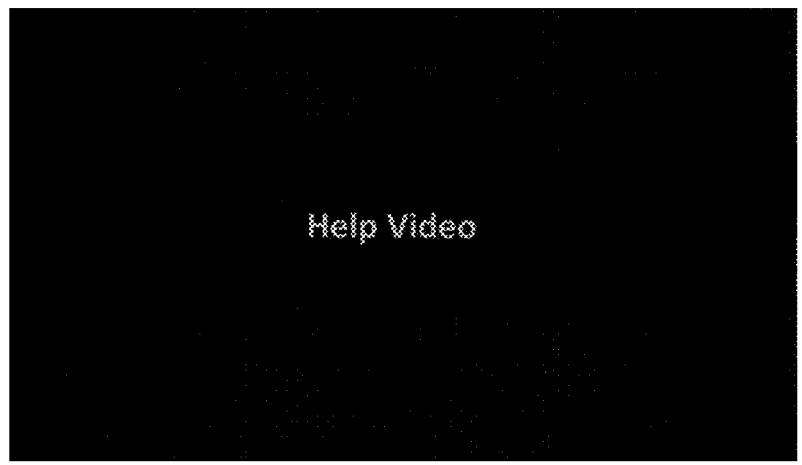
FIG. 6

Choose a Machine

Mighty Pro
$24.99

Wide Track
$29.99

BACK

Video

FIG. 7

Would you like a Hand Tool?

Hand Tool
$3.00

NO THANKS

BACK

Video

FIG. 8

How long do you need it?

48 hours
Only $XX more 24 hours
No additional cost

BACK

Video

FIG. 9

FIG. 10 — Would you like help selecting the proper cleaning solutions? YES / NO

Cleaning Solutions

FIG. 11 — Video / I understand / BACK

FIG. 12 — Here's what you'll need: Take your cleaning solutions to the cashier and pay for them. Tell the cashier you want to pay for the rental items below. Return here with your receipt.

RENTAL ITEMS
24hr MP Rental
Hand Tool

I will go PAY / I've got my RECEIPT / BACK

FIG. 13
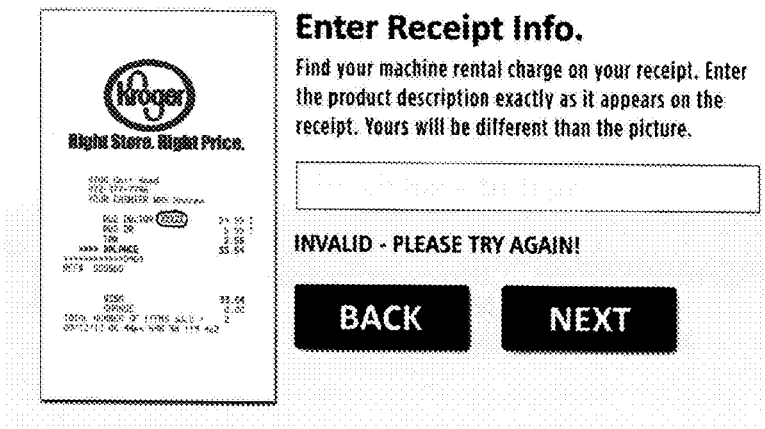
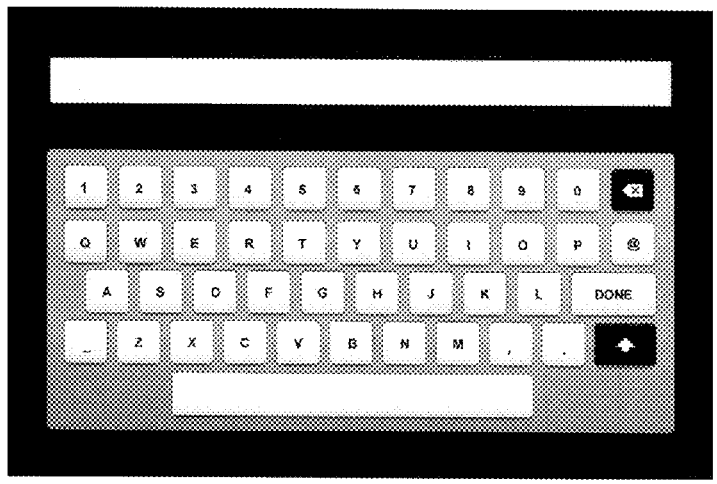
FIG. 14
FIG. 15
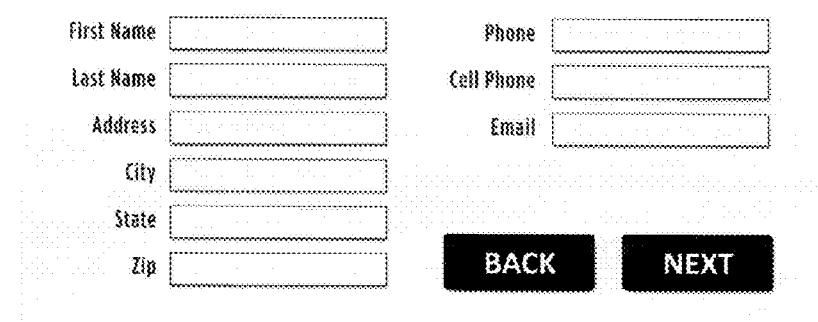

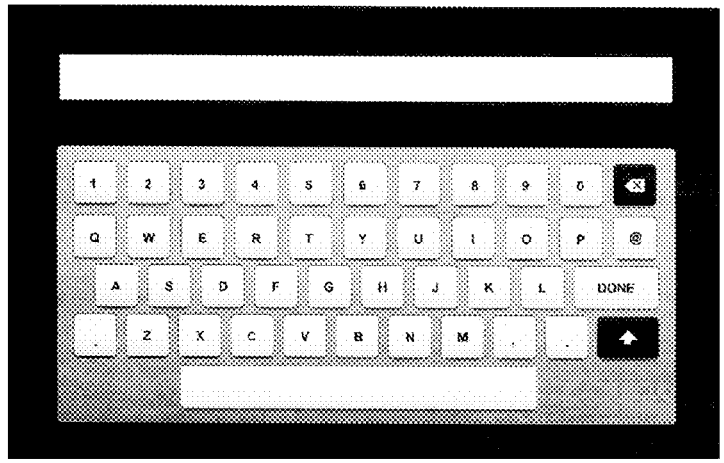
FIG. 16
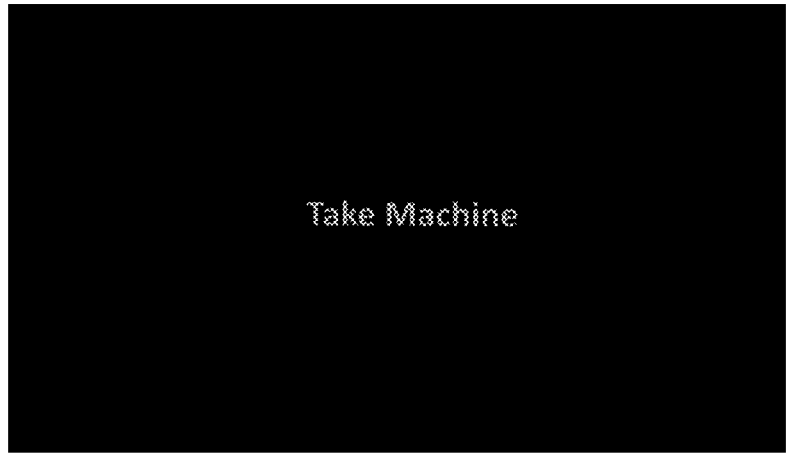
FIG. 17
FIG. 18

KIOSK AND METHOD FOR RENTING CARPET CLEANING MACHINES

CROSS-REFERENCE TO RELATED APPLICATIONS

This application claims the benefit of the filing date of provisional patent application Ser. No. 61/711,625, filed on Oct. 9, 2012, which is hereby incorporated by reference in its entirety.

STATEMENT REGARDING FEDERALLY SPONSORED RESEARCH OR DEVELOPMENT

Not Applicable.

APPENDIX

Not Applicable.

FIELD OF THE INVENTION

The present invention pertains to kiosks for renting/leasing carpet cleaning machines, and to methods of renting/leasing carpet cleaning machines via unmanned kiosks. More particularly, the present invention pertains to kiosks intended to be located within brick-and-mortar stores and that are configured to allow customers to input remotely generated code keys into the kiosks.

GENERAL BACKGROUND

Carpet cleaning machines have been available for renting from stores such as hardware stores and grocery stores for many years. Typically, a customer will enter the store and meet with personnel of the store to discuss renting a carpet cleaning machine. The customer and the store personnel typically exchange information regarding the period of time for which the carpet cleaning machine is desired to be rented, the cost for renting the carpet cleaning machine for that period of time, the identification information of the customer, the manner in which payment will be made for the rental and the payment for the rental. The customer will fill out a paper form documenting the rental transaction. The store personnel will then typically provide the customer with the rented carpet cleaning machine. The customer will then often select cleaning products to be used with the rented machine from the store shelves and purchase the products through the store cash register.

At the end of the rental period the customer then returns the carpet cleaning machine to the store and presents the returned machine to store personnel. The store personnel will then typically review the rental transaction made earlier to determine if the terms of the transaction have been complied with. The store personnel will then charge any additional fees if needed, for example, if the rental period had extended beyond the rental period of the original transaction, and complete the rental transaction with the customer. The store personnel will then return the machine to a storage rack.

In view of the foregoing, prior art methods of using store personnel to complete the paperwork associated with prior art methods of carpet cleaning machine renting/leasing placed a significant burden on such store personnel.

SUMMARY OF THE INVENTION

The kiosks associated with the present invention are similar to those described in U.S. Pat. No. 8,483,871, which is hereby incorporated by reference herein, in its entirety. However, the kiosks of the present invention are, for the most part, simpler than those of said patent and preferably are not configured to accept payment directly. This reduces the potential problems and added costs associated with accepting and confirming payment for rented equipment.

In one aspect of the invention, a kiosk for leasing carpet cleaning machines and accessories to customers comprises a storage unit and an electronic input device. The storage unit is configured to house at least one carpet cleaning device. The storage unit comprises at least one locking portion and an electronically controlled lock. The electronically controlled lock is able to, alternatively, lock and unlock the locking portion. The storage unit is configured such that, when a carpet cleaning machine is housed by the storage unit, the carpet cleaning machine can be secured thereto by electronically locking the locking portion via the electronically controlled lock, and such that the carpet cleaning machine can be removed from or returned to the storage unit when the locking portion is unlocked via the electronically controlled lock. The electronic input device is adapted and configured to obtain a code key from a customer and to cause the electronically controlled lock to unlock the locking portion following the receipt of the code key without any remote communication with any other non-customer device external to the kiosk.

Another aspect of the invention pertains to utilizing a kiosk located within a brick-and-mortar store to lease a carpet cleaning machine. The kiosk comprises a storage unit for housing the carpet cleaning machine. The storage unit comprises at least one locking portion and an electronically controlled lock. The electronically controlled lock is able to, alternatively, lock and unlock the locking portion. The storage unit is configured such that, when a carpet cleaning machine is housed by the storage unit, the carpet cleaning machine can be secured thereto by electronically locking the locking portion via the electronically controlled lock, and such that the carpet cleaning machine can be removed from or returned to the storage unit when the locking portion is unlocked via the electronically controlled lock. The electronic input device is adapted and configured to obtain a code key from a customer and to cause the electronically controlled lock to unlock the locking portion following the receipt of the code key without any remote communication with any other non-customer device external to the kiosk. The method also comprises advising customers via the kiosk to obtain the code key by paying a cashier in the brick-and-mortar store. The method still further comprises releasing the carpet cleaning machine by causing the electronically controlled lock to unlock the locking portion in response to the code key being obtained by the input device from a customer.

In yet another aspect of the invention, a method of leasing a carpet cleaning device via a kiosk comprises completing a financial transaction for the rental of a carpet cleaning machine secured to the kiosk. The financial transaction occurs without the use of the kiosk. The method also comprises receiving a code key in response to completing the financial transaction. Still further, the method comprises providing the code to the kiosk in a manner causing the kiosk to release the carpet cleaning machine.

Further features of the carpet cleaning machine rental kiosk of the invention are set forth in the following detailed description of the kiosk and in the drawing figures.

BRIEF DESCRIPTION OF THE DRAWINGS

The accompanying drawings, which are incorporated in and form a part of the specification, illustrate the embodi

FIGS. 4-23 are screen shots of information displayed on the electronic input device during use of the kiosk shown in FIGS. 1 and 2.

Figure 1:
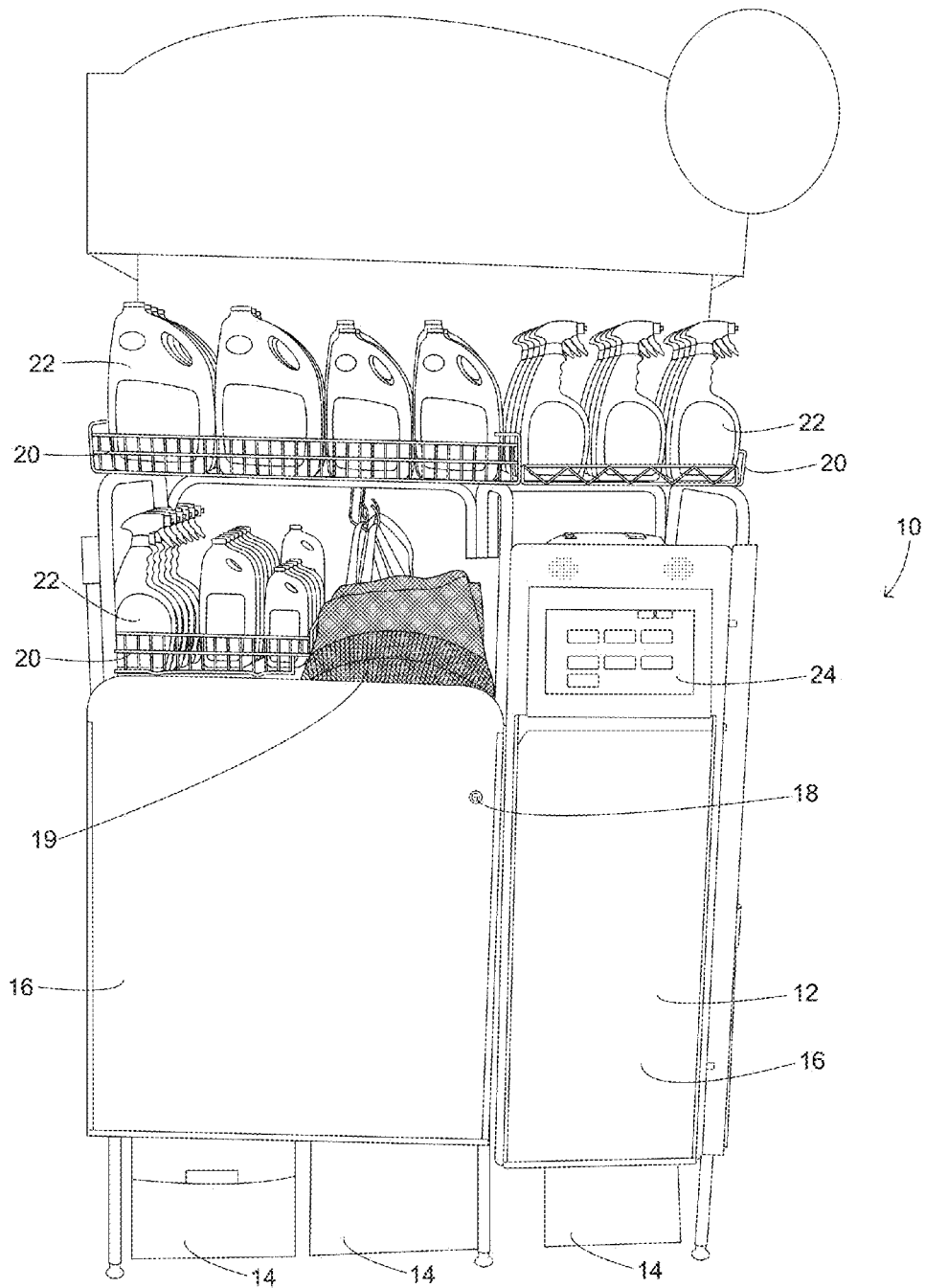
- FIG. 1 is a front view of a kiosk in accordance with the invention.

Reference numerals in the written specification and in the drawing figures indicate corresponding items.

DETAILED DESCRIPTION OF THE PREFERRED EMBODIMENT

Figure 2:
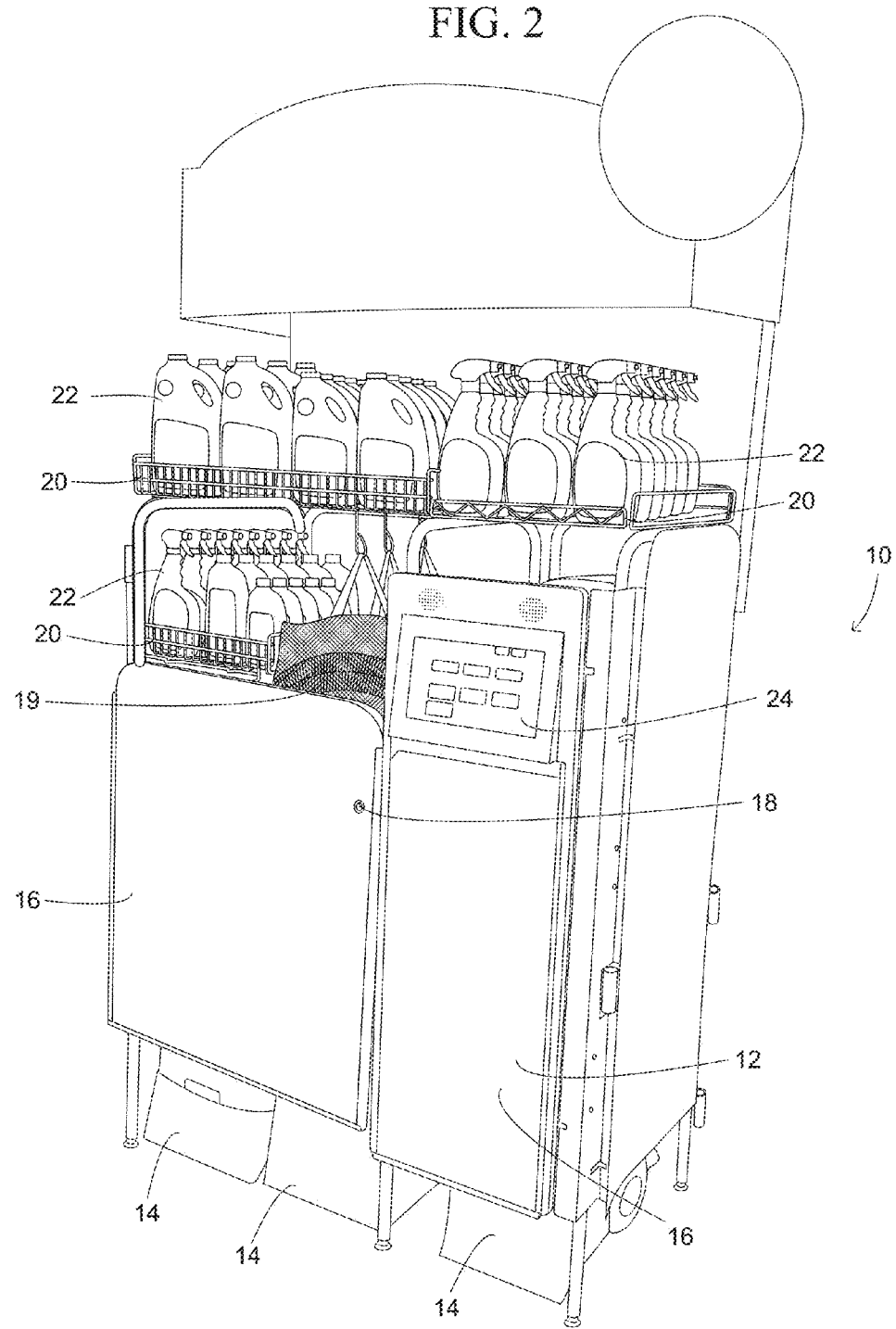
FIG. 2 is a perspective view showing the right and front sides of the kiosk shown in FIG. 1.
Figure 3:
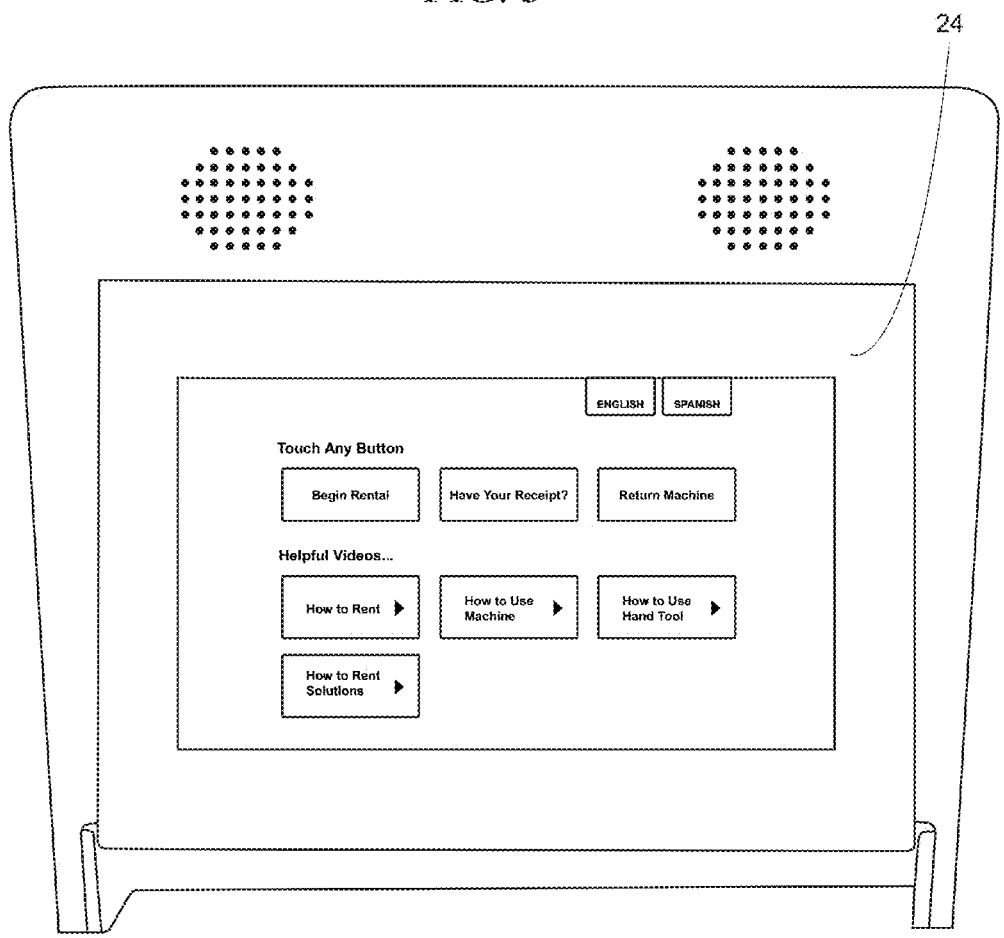
FIG. 3 is a detailed view of the electronic input device of the kiosk shown in FIGS. 1 and 2.
Figure 19:
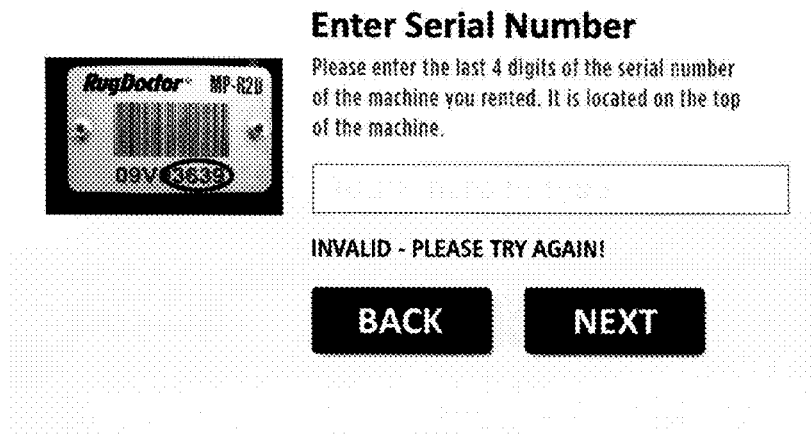
Figure 20:
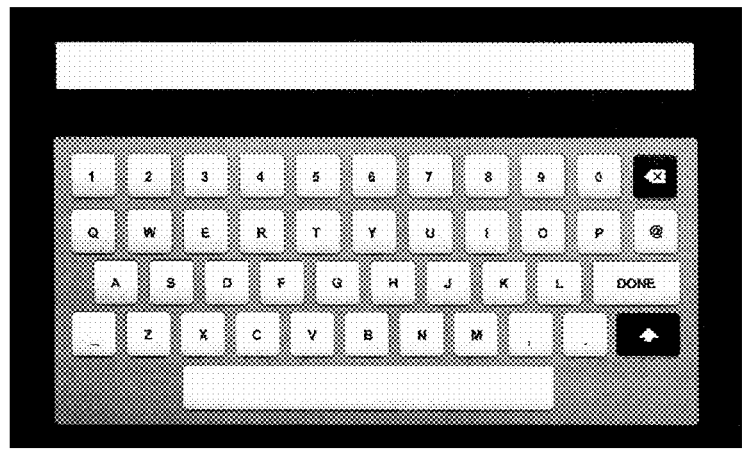
Figure 21:
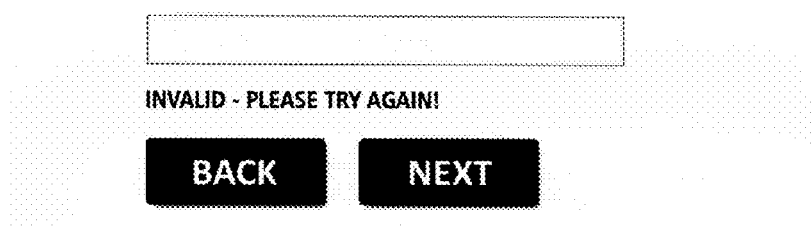
Figures 22, 23:
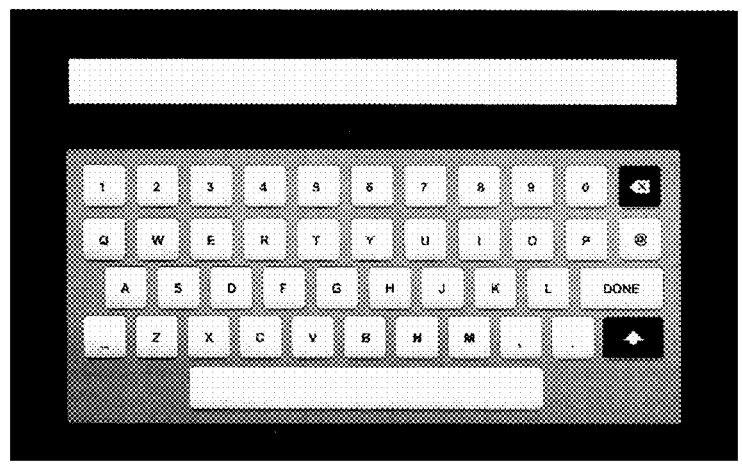

An embodiment of a kiosk in accordance with the invention is shown in FIGS. 1 and 2. The kiosk 10 comprises a storage unit 12 for housing at least one carpet cleaning machine 14. The storage unit comprises at least one lockable door 16 and an electronically-controlled lock 18. Preferably the storage unit 12 comprises two doors 16 and the electronically-controlled lock 18 is attached to one of the doors and is able to selectively lock that door to the other door in a manner such that neither of the doors can be opened without operating the electronically-controlled lock. The storage unit 12 is configured such that, when a carpet cleaning machine 14 is housed in the storage unit and the doors 16 are locked, the carpet cleaning machine cannot be removed from the storage unit without electronically unlocking the door. The storage unit 12 preferably also houses accessories for carpet cleaning machines 14, such as upholstery tools 19 as described in U.S. Patent App. No. 8,483,871. The kiosk 10 also preferably comprises product shelving 20 for supporting carpet cleaning products, such as cleaning solution 22. Still further, the kiosk 10 also comprises an electronic input device 24. The electronic input device 24 is preferably a commonly available tablet computer that comprises a touch screen and is operatively connected to the electronically-controlled lock 18 such that the tablet computer can control the operation of the electronically-controlled lock.

In operation, the kiosk is preferably located in a brick-and-mortar store and is preferably wired to an external power source, such as an outlet. The kiosk preferably comprises a transformer that converts alternating current from the power source into direct current for powering the electronic input device. The electronic input device is programmed to display various screens in response to touch inputs entered into the touch screen thereof by customers. Examples of various screen displays are shown in FIGS. 4-23. When not in use for an appreciable amount of time, the electronic input device preferably displays an image of carpet cleaning machines, such as is shown in FIG. 4. Upon touching the touch screen, the screen shown in FIG. 5 is preferably displayed on the electronic input device. In addition to displaying customer options for renting a carpet cleaning machine or returning a carpet cleaning machine, the screen also provides options for obtaining additional information regarding the use of the equipment and procedures for renting the carpet cleaning machines. As shown in the FIGS. 4-23, when a user is operating the device to rent a carpet cleaning machine, eventually a screen appears instructing the customer to go to a cashier at the brick-and-mortar store to pay for the rental of the items that the customer has selected. Prior to doing so, the doors of the kiosk remain locked and customers are therefore unable to remove carpet cleaning machines from the kiosk. When a customer informs a cashier that he or she wishes to rent the carpet cleaning equipment, the cashier will ring up the order in a manner similar to the way other products are normally purchased from the store. However, adjacent the listing of the carpet cleaning machine on the receipt will be printed a code key. The customer then returns to the kiosk and enters the code key into the kiosk. Upon receiving a valid code key, the customer is prompted to enter his or her identification and contact information. Finally, upon agreeing to various terms and conditions associated with the rental agreement, the electronic input device triggers the electronically-controlled lock to open, thereby allowing the customer to swing open one or more of the doors and to remove a carpet cleaning machine, and whatever other accessories the customer has rented, from the storage unit. Thereafter, the customer closes the doors of the storage unit. Upon doing so, the electronically-controlled locking device of the kiosk automatically reengages to lock the doors. As such, then no additional items can be removed by the customer. The customer may thereafter be prompted to enter the serial number of the carpet cleaning device prior to being informed that the transaction is complete.

When the customer returns the carpet cleaning device and accessories, the customer again accesses the electronic input device to begin the return process. The electronic input device may prompt the customer to enter the serial number of the carpet cleaning machine that the customer rented. Alternatively or in addition, the customer may be prompted to enter his or her contact information in a manner such that the electronic input device can store data confirming that the customer has returned the carpet cleaning equipment. The kiosk then unlocks the doors, thereby allowing the customer to return the carpet cleaning device and any tools to the kiosk. Like with the kiosk disclosed in U.S. Pat. No. 8,483,871, the kiosk of the present invention may contain a detection device (not shown) for detecting whether the carpet cleaning device, and possible tools, have been returned to the kiosk. The detecting device could be any type of known detection devices, such as an RFID tag/reader, optical beam, magnetic field gauge, etc. The inventors believe that these procedures, along with store security cameras and other standard security measures taken by the brick-and-mortar store, are sufficient to minimize theft of the rental equipment.

It should be appreciated from the foregoing that the carpet cleaning kiosk preferably does not perform the actual step of completing any financial transactions. In other words, the actual financial transaction takes place via the cashiers of the brick-and-mortar store in which the kiosk is located. Thus, the electronic input device of the kiosk needs not communicate remotely with any other device during the rental and return process described above and does not transmit financial information wirelessly. However, the electronic input device preferably does include a data port (not shown) that allows the owners of the kiosk to access the data stored on the input device. Preferably, that data includes the customer identification and contact information as well as data indicative of the frequency of rentals of the various equipment stored in the kiosk. Additionally, the electronic input device could comprise a wireless or hard-wired LAN connection for receiving and/or transmitting information to and/or from the owner of the kiosk and/or to and/or from the brick-and-mortar store for purposes of gathering such information, updating firmware or software, or for other reasons.

By eliminating the need for the kiosk to have some means of completing financial transactions, the cost of making and maintaining the kiosk is relatively low.

Although a particular embodiment and particular method of using a kiosk is described above, it should be appreciated that alternative embodiments of the kiosk and methods of using the kiosk could exist. For example, while it is desirous to eliminate the need for having a kiosk equipped to perform financial transactions, it is not necessarily required that such financial transactions take place in the brick-and-mortar store. For example, customers could access online financial transaction services for obtaining the code keys described above. The financial transaction service could be accessible via a website maintained by the kiosk owner. The kiosk owner could then also have an agreement with the owner of the brick-and-mortar store to compensate said owner for allowing the kiosk to be located within the brick-and-mortar store. Such compensation could be fixed or be dependent upon the extent to which customers utilize the kiosk to rent equipment. Thus, the code keys provided to the customer could be unique code keys specific to a particular kiosk and could be provided to customers prior to such customers arriving at the brick-and-mortar store.

It is believed that the preferred embodiment described above is the most advantageous method of using a kiosk in accordance with the present invention. This is because a customer typically purchases cleaning solutions when renting carpet cleaning machines. Such cleaning solutions are purchased in a manner similar to other products in the brick-and-mortar store. Thus, obtaining the code key from a cashier in the brick-and-mortar store requires the least effort by the customer to obtain a code key. Moreover, it increases the likelihood that customers will make on-the-spot decisions to rent carpet cleaning devices when they see the kiosk in brick-and-mortar stores.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A kiosk for leasing carpet cleaning machines to customers, the kiosk comprising:
   a storage unit for housing carpet cleaning devices, the storage unit comprising at least one locking portion and an electronically controlled lock, the electronically controlled lock being able to, alternatively, lock and unlock the locking portion, the storage unit being configured such that, when a carpet cleaning machine is housed by the storage unit, the carpet cleaning machine can be secured thereto by electronically locking the locking portion via the electronically controlled lock, and such that the carpet cleaning machine can be removed from or returned to the storage unit when the locking portion is unlocked via the electronically controlled lock;
   an electronic input device, the electronic input device being adapted and configured to obtain a code key from a customer, the electronic input device being configured to determine whether the code key is valid and, if so, cause the electronically controlled lock to unlock the locking portion following the receipt of the code key, all without any remote communication with any other non-customer device external to the kiosk.

2. A kiosk in accordance with claim 1 wherein the electronic input device is adapted and configured to cause the electronically controlled lock to unlock the locking portion upon receiving a serial number of a carpet cleaning device from a customer.

3. A kiosk in accordance with claim 2 wherein the electronic input device is configured to store data indicative of having received the serial number from a customer.

4. A kiosk in accordance with claim 1 wherein the electronic device is configured to receive and store customer data indicative of the customer's identity.

5. A kiosk in accordance with claim 1 wherein the electronic device is configured to receive return data and to associate the return data with the customer data.

6. A kiosk in accordance with claim 1 wherein the kiosk comprises walls adapted to partially surround the storage unit.

7. A kiosk in accordance with claim 6 wherein the locking portion is at least one door that can be opened and closed and the electronically controlled lock is configured to lock the door closed to secure the carpet cleaning device between the walls.

8. A kiosk in accordance with claim 1 wherein the kiosk further comprises a detection device that is capable of detecting whether a particular carpet cleaning machine is in a position to be secured to the storage unit by locking the locking portion via the electronically controlled lock.

9. A method comprising:
   utilizing a kiosk located within a brick-and-mortar store to lease a carpet cleaning machine, the kiosk comprising a storage unit for housing the carpet cleaning machine, the storage unit comprising at least one locking portion and an electronically controlled lock, the electronically controlled lock being able to, alternatively, lock and unlock the locking portion, the storage unit being configured such that, when a carpet cleaning machine is housed by the storage unit, the carpet cleaning machine can be secured thereto by electronically locking the locking portion via the electronically controlled lock, and such that, the carpet cleaning machine can be removed from or returned to the storage unit when the locking portion is unlocked via the electronically controlled lock, the electronic input device being adapted and configured to obtain a code key from a customer, the electronic input device being configured to determine whether the code key is valid and, if so, cause the electronically controlled lock to unlock the locking portion following the receipt of the code key, all without any remote communication with any other non-customer device external to the kiosk;
   advising customers via the kiosk to obtain the code key by paying a cashier in the brick-and-mortar store;
   releasing the carpet cleaning machine by causing the electronically controlled lock to unlock the locking portion in response to the code key being obtained by the input device from a customer.

10. A method in accordance with claim 9 wherein the kiosk comprises walls that are adapted to partially surround the storage unit and the locking portion is configured to selectively secure the carpet cleaning machine between the walls.

11. A method in accordance with claim 10 wherein the locking portion is at least one door that can be opened and closed and is configured to release or secure the carpet cleaning machine between the walls, and the method comprises releasing the carpet cleaning machine from between the walls by causing the electronically controlled lock to unlock the door in response to the code key being obtained by the input device from a customer.

12. A method in accordance with claim 9 wherein the code key is manually obtained by the input device by touch.

13. A method in accordance with claim 9 wherein the kiosk comprises a detection device and the method further comprising detecting the return of the carpet cleaning device via the detection device.

\* \* \* \* \*